(12) United States Patent
Huggett

(10) Patent No.: US 12,210,321 B2
(45) Date of Patent: Jan. 28, 2025

(54) METHODS AND APPARATUS FOR A TIME-TO-DIGITAL CONVERTER

(71) Applicant: SEMICONDUCTOR COMPONENTS INDUSTRIES, LLC, Phoenix, AZ (US)

(72) Inventor: Anthony Richard Huggett, Tadley (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 64 days.

(21) Appl. No.: 18/069,662

(22) Filed: Dec. 21, 2022

(65) Prior Publication Data

US 2023/0118370 A1 Apr. 20, 2023

Related U.S. Application Data

(63) Continuation of application No. 16/742,259, filed on Jan. 14, 2020, now Pat. No. 11,609,539.

(51) Int. Cl.
*G01S 17/10* (2020.01)
*G01S 7/4861* (2020.01)
*G04F 10/00* (2006.01)

(52) U.S. Cl.
CPC .......... *G04F 10/005* (2013.01); *G01S 7/4861* (2013.01); *G01S 17/10* (2013.01)

(58) Field of Classification Search
CPC ....... G04F 10/005; G01S 7/4861; G01S 17/10

USPC ....................................................... 356/5.08
See application file for complete search history.

(56) References Cited

U.S. PATENT DOCUMENTS

| | | | |
|---|---|---|---|
| 2003/0098731 A1 | 5/2003 | Tabatabaei | |
| 2012/0044102 A1 | 2/2012 | Henzler | |
| 2018/0164415 A1 | 6/2018 | Buckley | |
| 2018/0321363 A1 | 11/2018 | Beer | |

FOREIGN PATENT DOCUMENTS

| | | |
|---|---|---|
| CN | 103795406 A | 5/2014 |
| CN | 104137651 A | 11/2014 |
| CN | 206004959 U | 3/2017 |
| CN | 107153454 A | 9/2017 |
| CN | 109581333 A | 4/2019 |
| CN | 110308435 A | 10/2019 |
| WO | 2011058142 A1 | 5/2011 |

*Primary Examiner* — Nguyen T Truong
(74) *Attorney, Agent, or Firm* — Treyz Law Group, P.C.; Joseph F. Guihan

(57) ABSTRACT

Various embodiments of the present technology may provide methods and apparatus for a time-to-digital converter. The time-to-digital converter may include a state machine that increments/decrements according to an input signal and a count value. The time-to-digital converter may further include a register to store the count value according to the input signal.

7 Claims, 16 Drawing Sheets

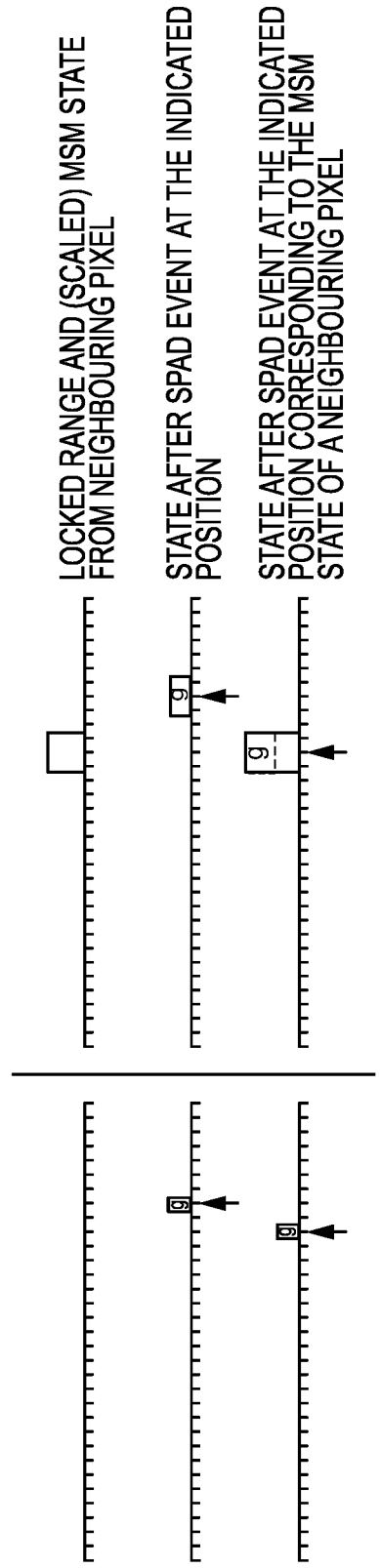

METHODS AND APPARATUS FOR A TIME-TO-DIGITAL CONVERTER

This application is a continuation of U.S. patent application Ser. No. 16/742,259, filed Jan. 14, 2020, which is hereby incorporated by reference herein in its entirety.

BACKGROUND OF THE TECHNOLOGY

Time-to-digital converters are used in many different applications where the time interval between two signal pulses (start and stop pulse) should be determined. For example, light detection and ranging (LiDAR) systems typically use a time-to-digital converter to determine the time interval between a transmitted pulse and a reflected pulse.

LiDAR direct time of flight (dToF) sensors employing single photon avalanche diodes (SPADs) suffer from very high levels of interference from random photons, such as solar photons. To accurately determine the range of a target, conventional time-to-digital converters calculate a histogram, counting the number of SPAD events at every range gate over a number of laser pulses, where the set of laser pulses is referred to as a frame. This approach may be suitable for 1-dimensional and very small 2-dimensional arrays. However, the approach does not scale well to video graphic array (VGA) sized 2-dimensional arrays, where the area consumed by the TDC must be the same as the pixel pitch, even considering a stacked wafer approach. The histogram TDC approach requires N range bins to be stored per pixel, where N is the number of ranges that can be measured and is typically in the range of 128 to 1024. In addition, the N counts must all be read before further processing can determine the peak location and confidence, which means that each pixel can produce several kilobytes of data per frame. Moreover, a histogram has to be cleared before the start of the next frame. Thus the update of the readout is tied to the number of laser pulses comprising a frame.

A VGA 2-D array of SPADs will typically be used in a flash LiDAR system, in which the whole scene is illuminated by the laser at the same time. For a maximum range of 150 meters, the pulses can be no closer than 1 us apart for a 300 m round trip, and a frame time of 33 ms allows 33,000 such pulses within the frame.

Therefore, it may be desired to provide a TDC that does not require a histogram, stores a minimal amount of counts, and is suitable for large 2D arrays, in particular, for use in flash LiDAR systems.

SUMMARY OF THE INVENTION

Various embodiments of the present technology may provide methods and apparatus for a time-to-digital converter. The time-to-digital converter may include a state machine that increments/decrements according to an input signal and a count value. The time-to-digital converter may further include a register to store the count value according to the input signal.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates a LiDAR system in accordance with various embodiments of the present technology;

FIG. 2 is a block diagram of a time-to-digital converter featuring a state machine in accordance with a first embodiment of the present technology;

FIG. 3 representatively illustrates an operation of the state machine in accordance with various embodiments of the present technology;

Figure 9:
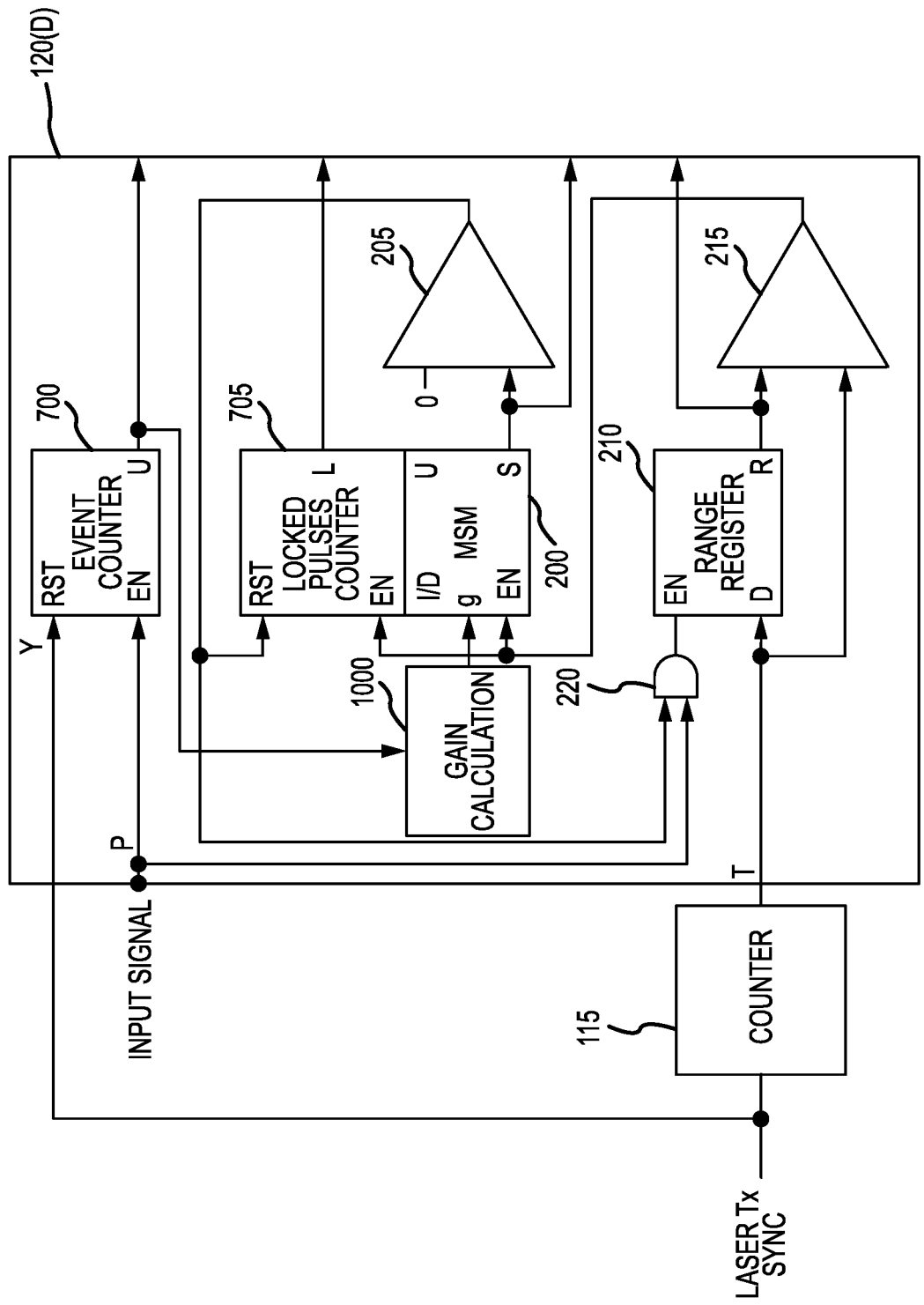
FIG. 9 is a block of a time-to-digital converter in accordance with a fourth embodiment of the present technology.
Figure 10A:
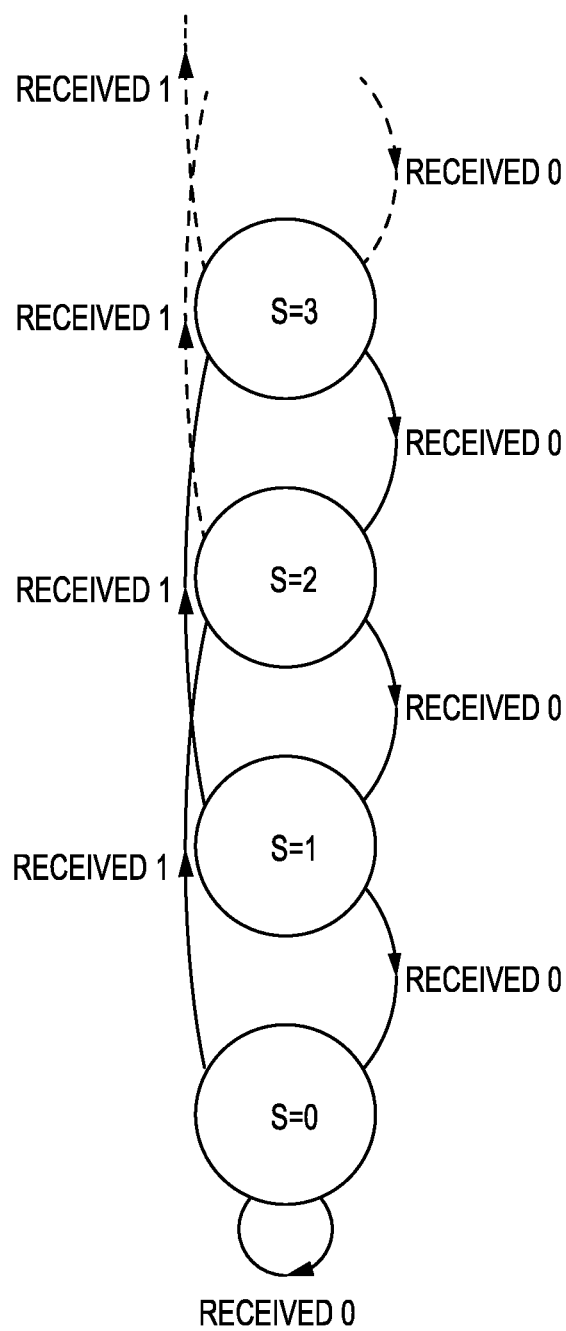
Figure 10B:
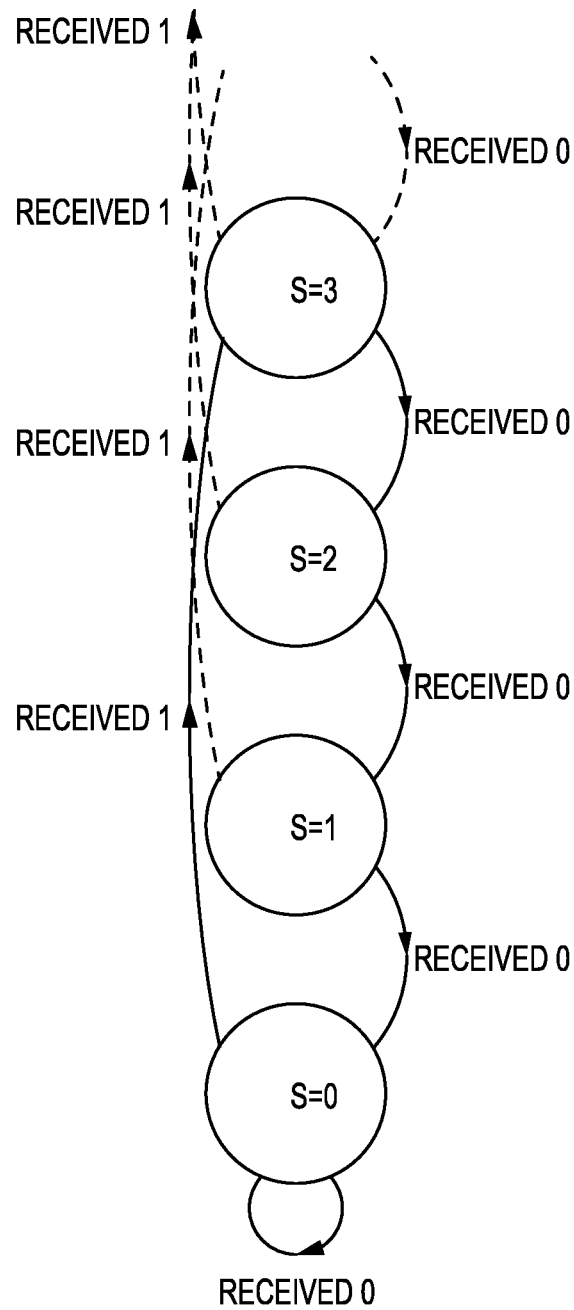
Figure 11:
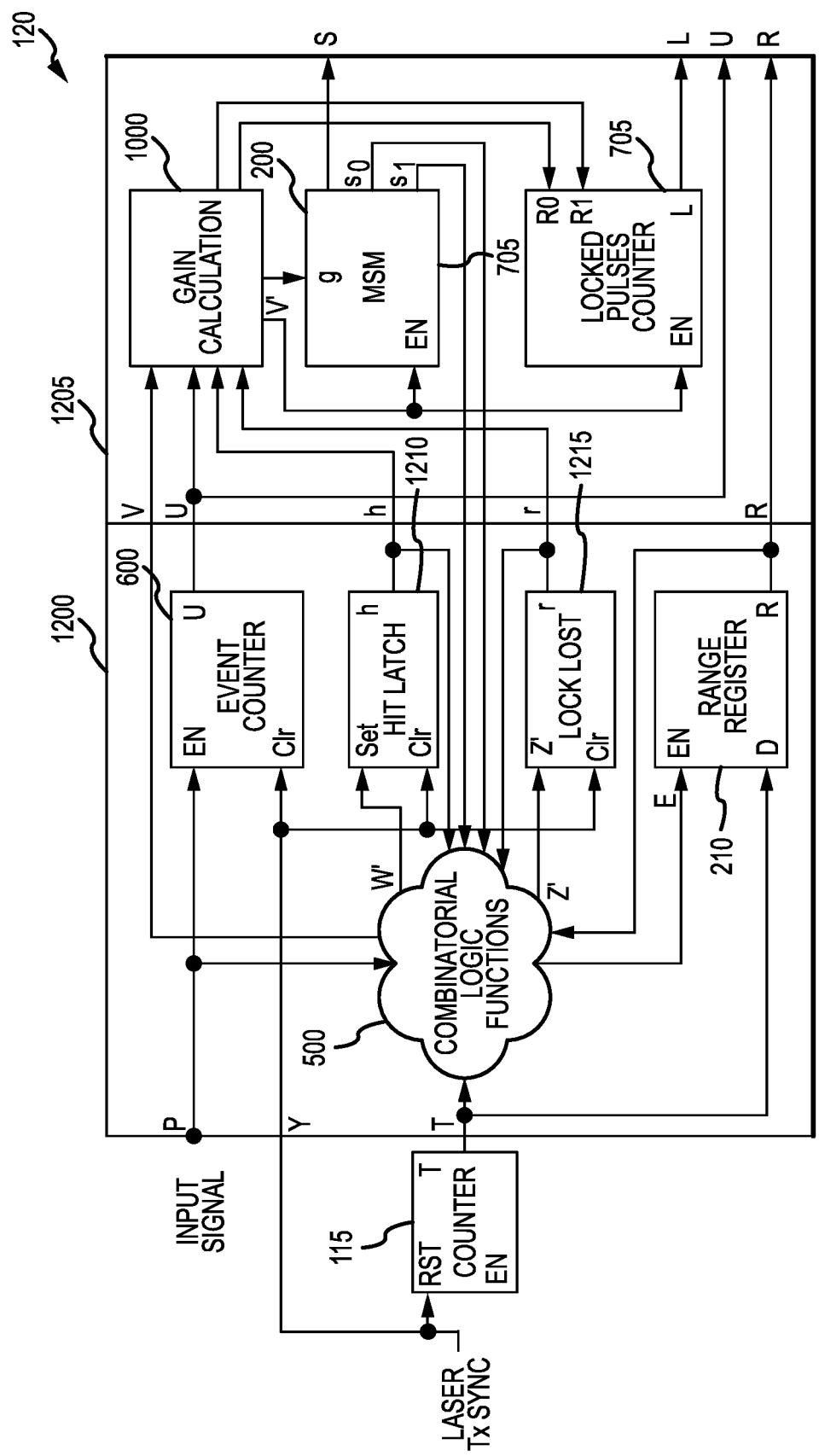
Figure 12:
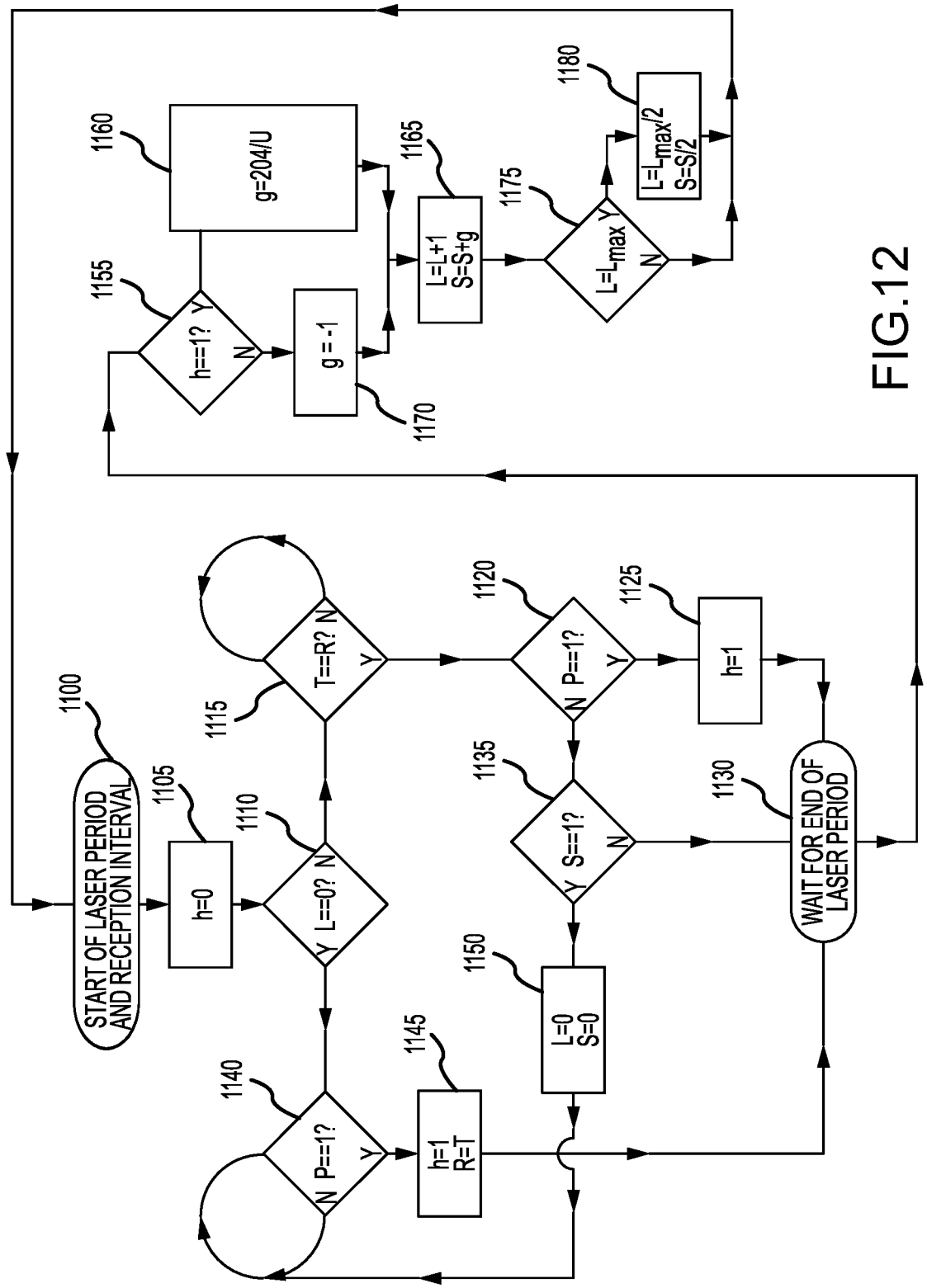
Figure 13:
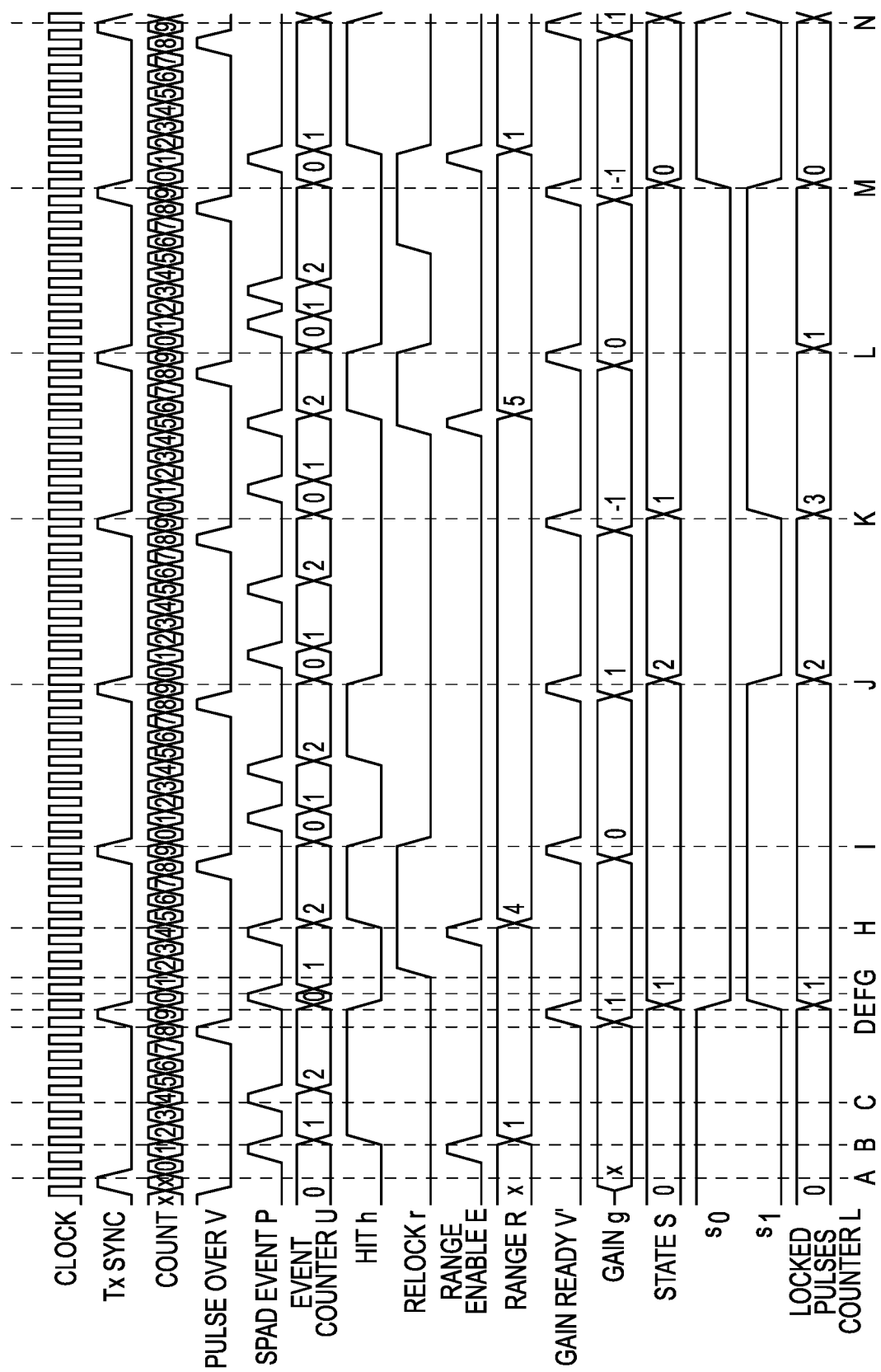
Figures 14A, 14B:
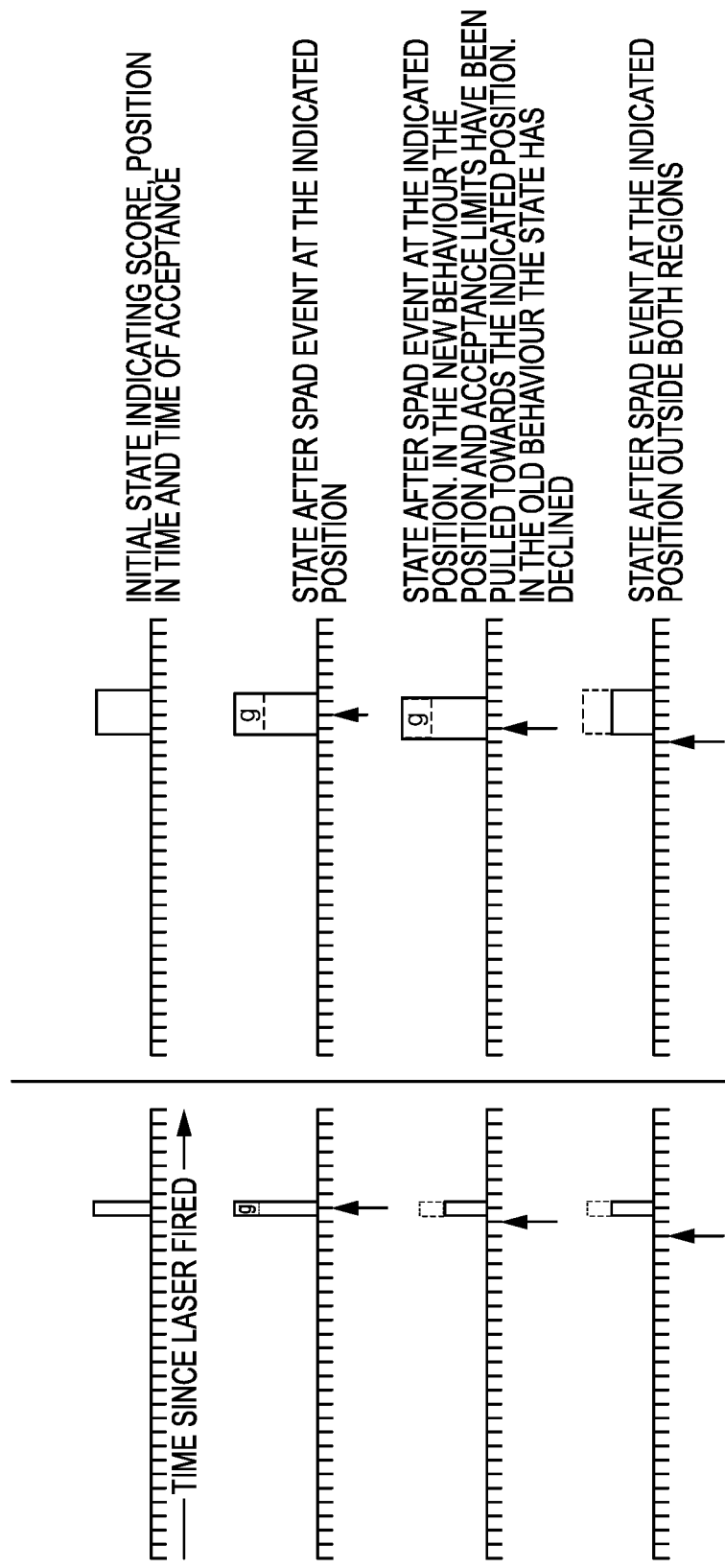
Figure 16:
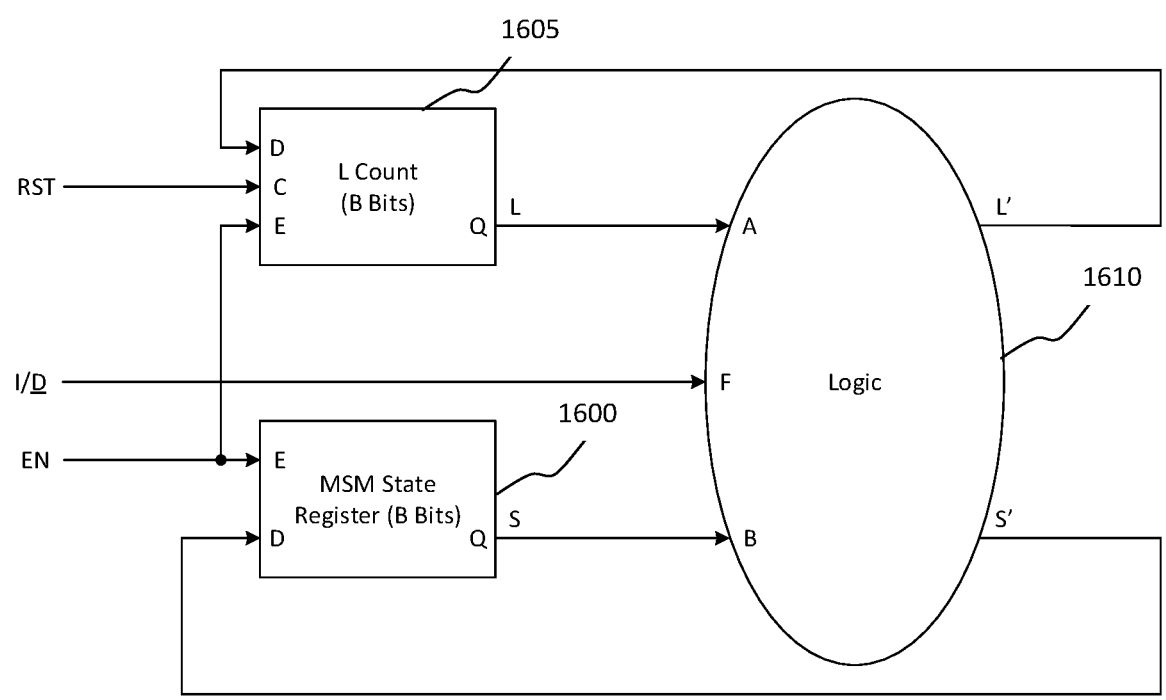

FIG. 10A representatively illustrates an operation of the state machine illustrated in FIG. 9 in accordance with various embodiments of the present technology;

FIG. 10B representatively illustrates an operation of the state machine illustrated in FIG. 9 in accordance with various embodiments of the present technology;

FIG. 11 is a block of a time-to-digital converter in accordance with a fifth embodiment of the present technology;

FIG. 12 is a flow diagram for deferred operation of a time-to-digital converter according to various embodiments of the present technology;

FIG. 13 is a timing diagram of the time-to-digital converter illustrated in FIG. 11 in accordance with an exemplary embodiment of the present technology;

FIG. 14A representatively illustrates the behavior of a state machine that does not provide range following;

FIG. 14B representatively illustrates the behavior of a state machine that does provide range following in accordance with various embodiments of the present technology;

FIG. 15A representatively illustrates the behavior of a state machine that does not provide azimuth/elevation following;

FIG. 15B representatively illustrates the behavior of state machine that does provide azimuth/elevation following in accordance with various embodiments of the present technology; and FIG. 16 is a partial block diagram of a time-to-digital-converter in accordance with various embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various counters, logic gates, memory devices, semiconductor devices, such as transistors and capacitors, and the like, which may carry out a variety of functions. In addition, the present technology may be integrated in any number of electronic systems, such as automotive, aviation, "smart devices," portables, and consumer electronics, and the systems described are merely exemplary applications for the technology.

Figure 1:
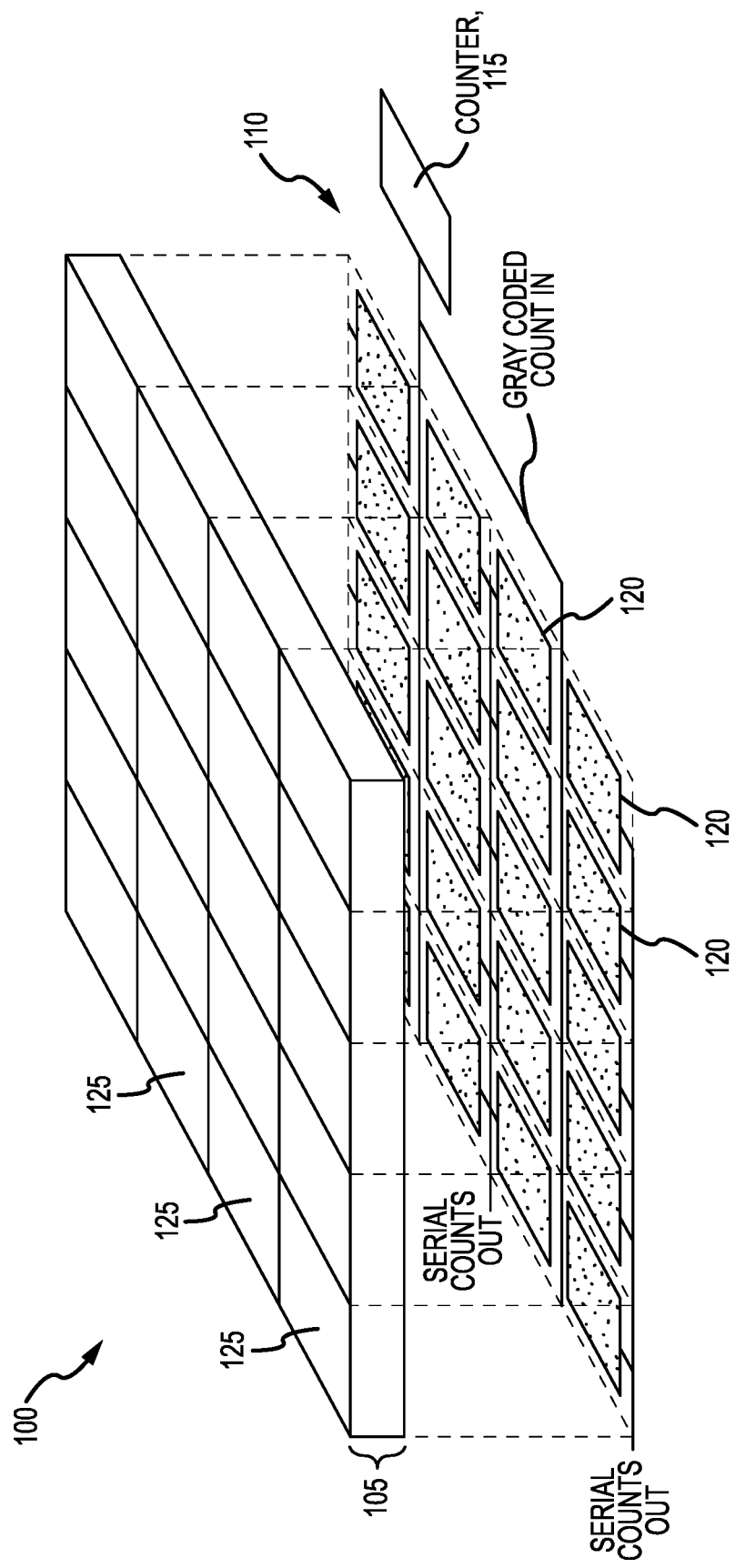

Referring to FIG. 1, methods and apparatus for a time-to-digital converter (TDC) according to various aspects of the present technology may be integrated in an active ranging sensor, such as a light detection and ranging (LiDAR) system 100, configured to transmit a pulse, detect a reflected pulse, and determine a range to a target based on the time delay between the transmitted pulse to the detected pulse (i.e., the round trip delay) In general, LiDAR systems and other active ranging sensors may measure range to a target by direct time of flight (the round trip delay). In this method, a laser or other transmitter (not shown) fires a laser pulse (transmission signal) at the target and a returning photon from the target is detected by a photodetector, such as a single photon avalanche diode (SPAD). The SPAD is operated at a high rate $f_s$, starting at the time that the laser pulse was fired, and a count n is kept of the number of operations. If a photon is detected by the SPAD then the range r may be inferred from $r=cn/(2f_s)$, where c is the speed of light. According to an exemplary embodiment, the system 100 may comprise a pixel array 105, a time-to-digital converter (TDC) array 110 comprising a plurality of TDCs 120, and a counter 115.

The pixel array 105 may be configured as a 2-dimensional array comprising a plurality of pixels. Each pixel 125 from the plurality of pixels may be configured to detect light and may comprise a single photon avalanche diode (SPAD) or any other suitable photodetector. Each pixel 125 may generate an input signal P corresponding to activity/non-activity in that pixel 125. The input signal indicating a detected photon may be referred to as a SPAD event and may be represented as a first value (e.g., any value greater than 0 and may be referred to as a SPAD pulse), while a non-event (in which no photons are detected) may be represented by a second value (e.g., 0). The signals representing the SPAD events and non-events may be transmitted to the TDC array 110 and may be referred to as an input signal, wherein the input signal comprises the first value (e.g., any value greater than 0) and the second value (e.g., 0).

The counter 115 may be configured to generate the count value and transmit the count value to each TDC 120 in the TDC array 110. The counter 115 may comprise any circuit and/or system suitable for generating a binary code representing a count value. For example, the counter 115 may be configured as a Gray code counter, wherein the counter 115 generates an n-bit binary code. The count value may increment by 1 on each clock cycle until it is reset to 0 at the start of each laser period (LP) and reception interval (RI). The start of the laser period and reception interval are the same and may be initiated by the triggering of the transmission of a laser pulse. The laser period is the time between successive transmitted laser pulses. According to various embodiments, the laser period and the reception interval may have a same time duration.

In some embodiments, the reception interval may be less than the duration of the laser period. In such cases, the gap between the end of the reception interval and the end of the laser period may be due to the amount of time needed to perform various calculations (as described below) and/or specifications of the laser.

In various embodiments, the reception interval may depend on a maximum range to be measured by the LiDAR system 100. For example, for a maximum range of 150 m, the reception interval will be 1 µs (the round trip distance, 300 m, divided by the speed of light). During the reception interval, the TDC 120 is responsive to an input signal P (e.g., the SPAD event).

According to various embodiments, each TDC 120 from the TDC array 110 may receive various signals, such as the count value and the input signal, and estimate the time of arrival of the reflected photon. In one embodiment, each TDC 120 may receive an input signal from a co-located pixel 125. In an alternative embodiment, a portion of the TDC 120 may be shared among two or more pixels 125. The TDC 120 may be configured generate a state and a range, each represented as a binary number. According to various embodiments, the TDC 120 may comprise a state machine 200 and a range register 210.

According to various embodiments, the state machine 200 may be configured to change states based on the input signal. For example, the state machine 200 may comprise a Markov state machine. The state machine may be configured to have an enable input such that the state machine can only change state when the enable input is set to a particular value. The state machine 200 may be initialized to state 0 and, at every enabled time step, may be configured to increment if a 1 is received and decrement if a 0 is received. The state machine 200 may be implemented by a single increment/decrement on a counter having $\log_2 P$ bits, with a clock and an enable signal, where P−1 is the maximum number of ones that may be counted, wherein a 1 causes an increment in the count and a 0 causes a decrement on any enabled clock cycle.

According to various embodiments, the state machine 200 may comprise any number of states. The number of states may be based on the particular application and a maximum number of states may be equal to $\delta \times g_{max}$, where $\delta$ is the number of laser pulses and $g_{max}$ is a maximum gain value.

According to various embodiments, the TDC 120 may comprise one or more registers, such as the range register 210 and an auxiliary register 505. The range register 210 may receive the count value from the counter 115. The range register 210 may be configured to store the count value based on the current state of the state machine 200 and the input signal. The stored count value may be referred to as a range value. For example, when the current state is 0, a SPAD event arriving causes the range register 210 to be set to the value of the counter 115. The state machine 200 is incremented into state 1. Thereafter, further SPAD events during the same reception interval are ignored. Within the next reception interval caused by the next laser pulse, the TDC 200 ignores SPAD events occurring before the count value has reached the range value. If a SPAD event occurs when the count value is equal to the range value, the current state is incremented, strengthening confidence that the TDC 200 is estimating the correct range, and we ignore further SPAD events within this reception interval. If no SPAD event occurs when the count value is equal to the range value, the current state is decremented. If the resulting state is 0, the next SPAD event causes the range register 210 to lock to a new counter value. This may happen within the same reception interval or in any subsequent reception interval. Thus when the lock state is 0, the state machine 200 may have opportunity to lock to later values of the counter 115 than the stored value in range register 210, before it has opportunity to lock to earlier values which may prevent a condition known as pile-up, whereby random photons arising from ambient light cause the circuit to go into lock early in every reception interval when it is unlocked and thereby prevent the circuit from ever locking to a count value corresponding to a distant target.

The auxiliary register 505 may be configured to allow the state machine to undergo one state transition per reception interval whilst preserving the behavior that it has opportunity to lock to later values of counter 115 before earlier ones may be considered. When the state is 1 and no SPAD even occurs when the value of counter 115 equals the range value, the state is decremented to 0 and the auxiliary register 505 is set. The state machine 200 has now undergone a state transition and any SPAD events occurring within the same reception interval are ignored. In the next reception interval, the auxiliary register 505 remains set until the count value equals the locked value, after which it is unset. Any SPAD events occurring whilst the auxiliary register 505 is set are ignored.

The range register 210 and the auxiliary register 505 may comprise any circuits and/or device suitable for storing binary data, such as a group of cascaded flip-flops and the like.

According to various embodiments, the state machine 200 may comprise a state register (not shown) to store a current state S and the locked pulses counter 705 may comprise a count register (not shown) to store a current count value L.

The logic circuit may comprise any number of circuits and/or logic device suitable for implementing a desired operation of the TDC 120. For example, and referring to FIGS. 2, 7, and 9, the logic circuit may comprise a first comparator 205, a second comparator 215 and an AND gate. The first comparator 205 may be connected to the state machine 200 and receive the current state. The first comparator 205 may generate a first comparator output based on the current state and a reference value (e.g., 0).

The AND gate 220 may be connected between the first comparator 205 and the range register 210. For example, the AND gate 220 may receive the first comparator output at one input terminal and the input signal at a second input terminal. The AND gate may perform a logic AND function based on the two inputs and transmit an AND output to the range register 210, wherein the AND output may be used to enable the range register 210.

The second comparator 215 may be connected to an output of the range register 210 and receive the stored range value. The second comparator 215 may also receive the count value from the counter 115. The second comparator 215 may generate a second comparator output based on the stored range value and the count value.

Figure 5:
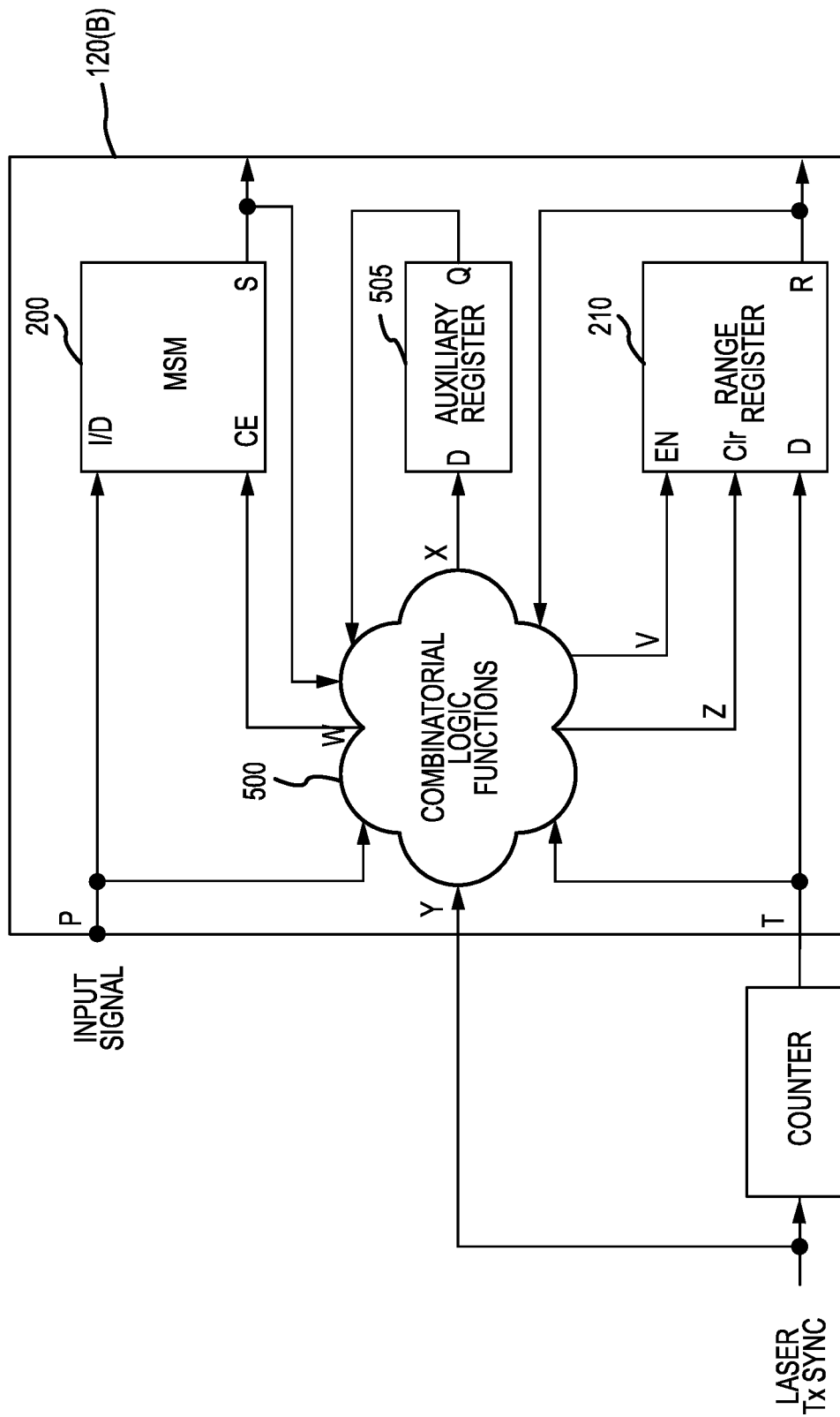
FIG. 5 is a block diagram of a time-to-digital converter in accordance with a second embodiment of the present technology.

According to alternative embodiments, and referring to FIGS. 5 and 11, the logic circuit may comprise any number of circuits and/or systems used to perform desired logic functions and transmit signals to the state machine 200 and the range register 210. According to the present embodiments, the logic circuit may receive at least one of: a sync signal Y, the count value T, and the input signal P.

Referring to FIGS. 9 and 12, the TDC 120 may comprise additional internal counters, such as event counter 700 and a locked pulses counter 705. In various embodiments, the event counter 700 may be configured to count a total number of SPAD events U that occur within a given reception interval. The locked pulses counter 705 may be configured to count a total number of laser pulses since the state machine 200 was in state zero (count value L).

According to various embodiments, and FIGS. 9 and 11, the TDC 120 may comprise a gain calculator 1000 configured to compute a gain g. In various embodiments, the gain calculator 1000 may compute the gain g based on the number of SPAD events U and transmit the gain g to the state machine 200. According to various embodiments, the gain g may be calculated according to the following equation:

$$g = \text{round}\left(\frac{N}{5U}\right)$$

The gain calculator 1000 may comprise any number of circuits and/or devices suitable for performing the equation above.

According to various embodiments, and referring to FIG. 11, the TDC 120 may further comprise various latches to indicate a desired condition or event. For example, the TDC 120 may comprise a hit latch 1210 configured to generate a hit signal h that indicates that an expected SPAD event has occurred if the state machine is in lock or that a new lock has been established if the state machine 200 was out of lock. The TDC 120 may further comprise a lock lost latch 1215 configured to generate a lock lost signal r that mimics the behavior of the state machine 200 falling out of lock and relocking at a later time, but in the same reception interval.

In one embodiment, and referring to FIG. 11, the TDC 120 may comprise a first sub-circuit 1200 that operates at the same speed as the clock and a second sub-circuit 1205 that operates once per laser period, after the end of the corresponding reception interval. In the present case, the first sub-circuit 1200 may comprise the event counter 600, the hit latch 1210, the lost lock latch 1215, the range register 210, and a combinatorial logic circuit 500. The second sub-circuit 1205 may comprise the gain calculator 1000, the state machine 200, and the locked pulses counter 705.

In the present embodiment, the combinatorial logic circuit 500 may operate according to the following equations:

$$W' = (s_0 + (T == R) + r).P$$

$$Z' = \begin{cases} 0 & | & Y = 1 \\ 1 & | & s_1.(T == R).\overline{P} \\ r & | & \text{otherwise} \end{cases}$$

$$E = (r + s_0).P$$

$$R0 = (r == 1).(h == 0)$$

$$R1 = (r == 1).(h == 1)$$

In the present embodiment, each pixel 125 may be directly connected to a corresponding first sub-circuit 1200 and second sub-circuit 1205. In other words, the first sub-circuit 1200 and the second sub-circuit 1205 is replicated for each pixel 125.

In alternative embodiments, a pixel 125 may be directly connected to a corresponding first sub-circuit 1200 but may share a single second sub-circuit 1205 with a number of other pixels 125, such as those pixels that are directly adjacent, within a defined local region, within the same row, within the same column, or the like.

According to various embodiments, the TDC 120 operates according to the state machine 200, which changes state according to SPAD events and the timing of the SPAD event, which may be realized by comparing the value of the counter 115 with the value of the range register 210. The state machine 200 is initialized to state 0. Initially, the value of the range register 210 is 'don't care.' When the current state of the state machine 200 is 0, a SPAD event arriving causes the range register 210 to be set to the value of the counter 115. The state machine 200 is then incremented into state 1. Thereafter, further SPAD events during the same reception interval are ignored. On the next laser pulse, SPAD events occurring before the value stored in the range register 210 are ignored. If a SPAD event occurs at the time stored in the range register 210, the state is incremented, which increases the confidence level that the state machine 200 is predicting the correct range, and additional SPAD events that occur after this time are ignored until the next laser pulse. If no SPAD event occurs at the time stored in the range register 210, the state is decremented. If the state is 0, the next SPAD event causes the range register 210 to lock to a new counter value as at the start.

Figure 2:
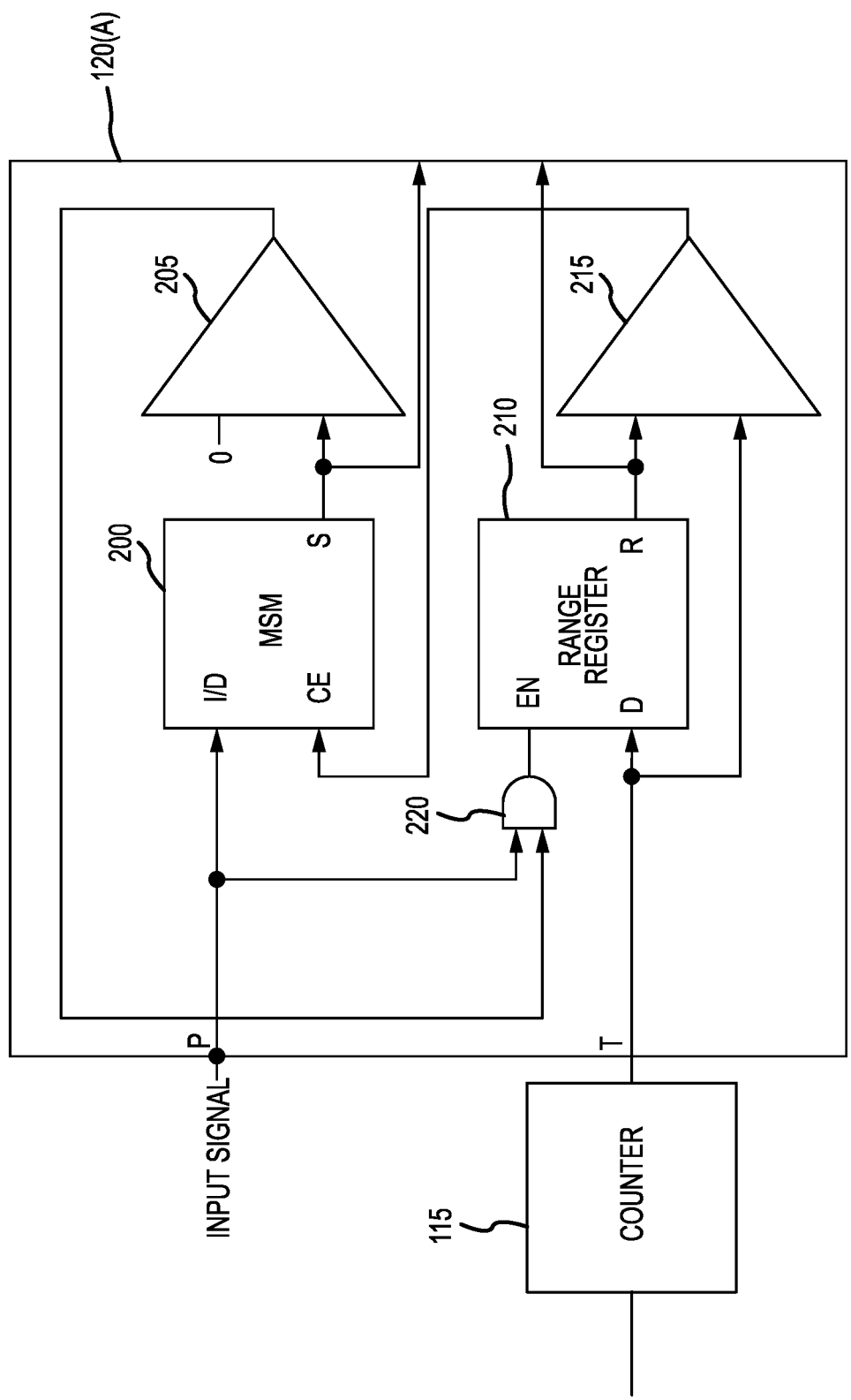
Figure 3:
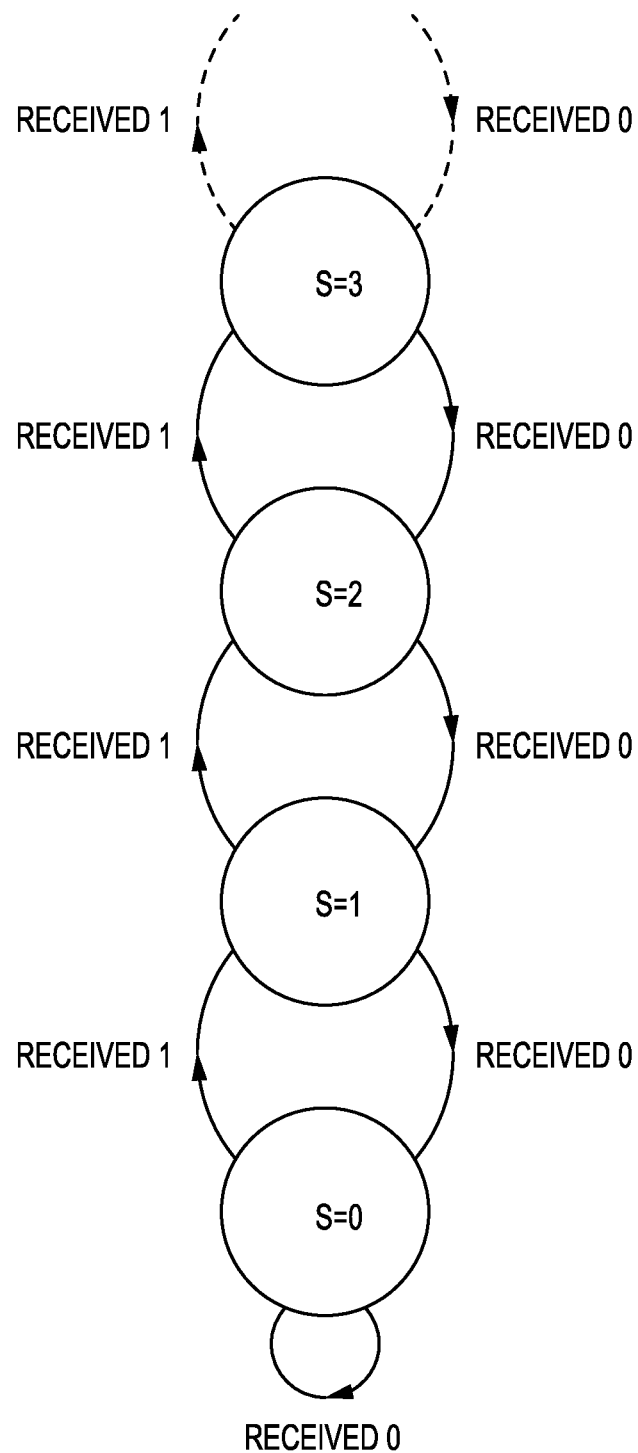
Figure 4:
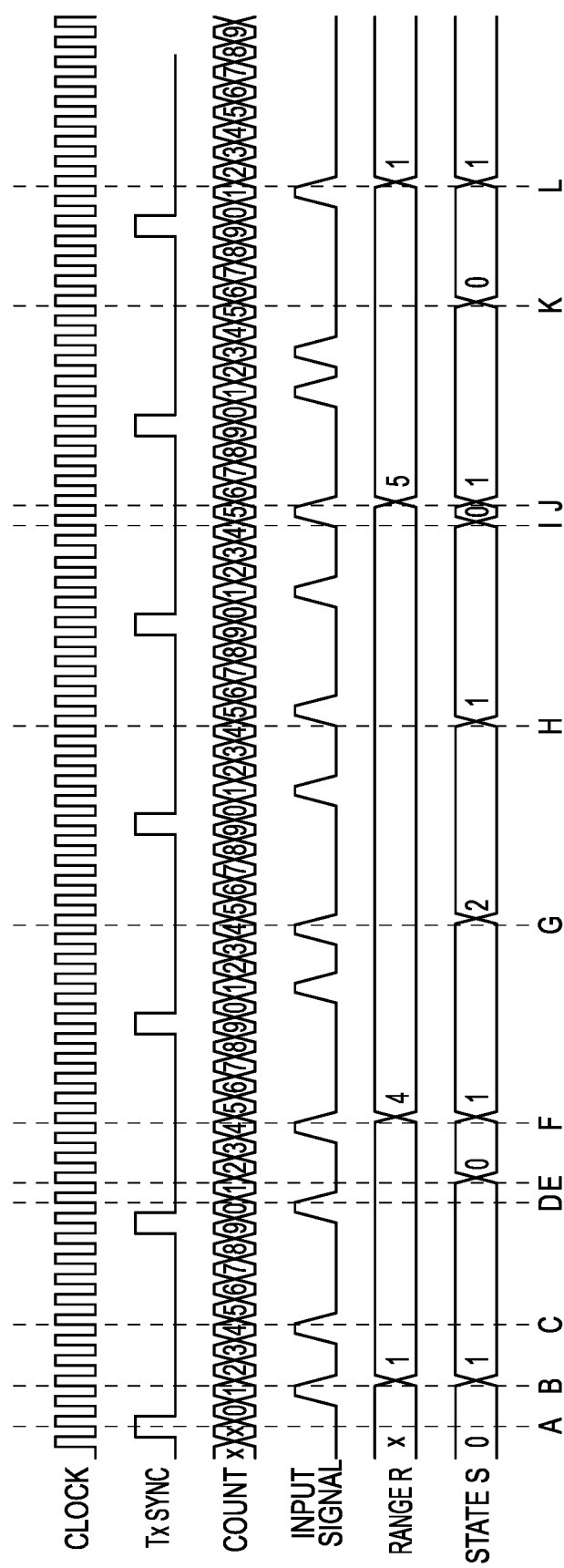
FIG. 4 is a timing diagram of the time-to-digital converter illustrated in FIG. 2 in accordance with an exemplary embodiment of the present technology.

In one exemplary embodiment and operation, and referring to FIGS. 2-4, the system has 10 clock cycles between every laser pulse, and the counter counts repeatedly from 0 to 9. Each count from 0 to 9 may be referred to as the reception interval (RI), which in this case is the same duration as the laser period. When the current state is 0, the initial value R of the range register 210 is of no significance. In an example operation, and referring to FIG. 4, the TDC 120 may undergo the following sequence of events:

At time A, the $1^{st}$ Tx Sync indicates the start of the 1st RI, and this causes the count to reset to 0 (as do all subsequent Tx Syncs).

At time B, a pulse is received indicating that the SPAD has detected a photon. With the state machine 200 at state 0, the range register R is loaded with the value of the counter, 1, and the state increments from 0 to 1.

At time C, a second SPAD pulse is received within the 1st RI, and it is ignored.

At time D, a SPAD pulse is received within the 2nd RI when the counter is 0. The range register is 1 so this event is ignored.

At time E, no SPAD pulse is received when the counter is equal to the range register. This causes the state to drop to 0.

At time F, a SPAD pulse is received when the counter is 4 and the state is 0. This causes the range register 210 to be loaded with the counter value, 4, and the state to increment to 1.

At time G, within the 3rd RI the range register is already 4 when the count value is 4. This increments the state from 1 to 2.

At time H, within the 4th RI, the range register 210 is 4 and no SPAD pulse is received when the count value is 4. This decrements the state of the state machine 200 from 2 to 1.

At time I, within the 5th RI, the range register 210 is 4 and no SPAD pulse is received when the count value is 4. This decrements the state of the state machine 200 from 1 to 0.

At time J, with the MSM state at 0, the range register 210 is loaded with the value of the counter 115, 5, and the state of the state machine 200 increments from 0 to 1.

At time K, within the 6th RI, the range register 210 is 5 and no SPAD pulse is received when the count value is 5. This decrements the state of the state machine from 1 to 0.

At time L, no further SPAD pulse was detected between K and the start of the 7th RI. Within the 7th RI a SPAD pulse is detected with the state at 0 so the range register 210 is loaded with the value of the counter 115, 1, and the state of the state machine increments from 0 to 1.

Figure 6:
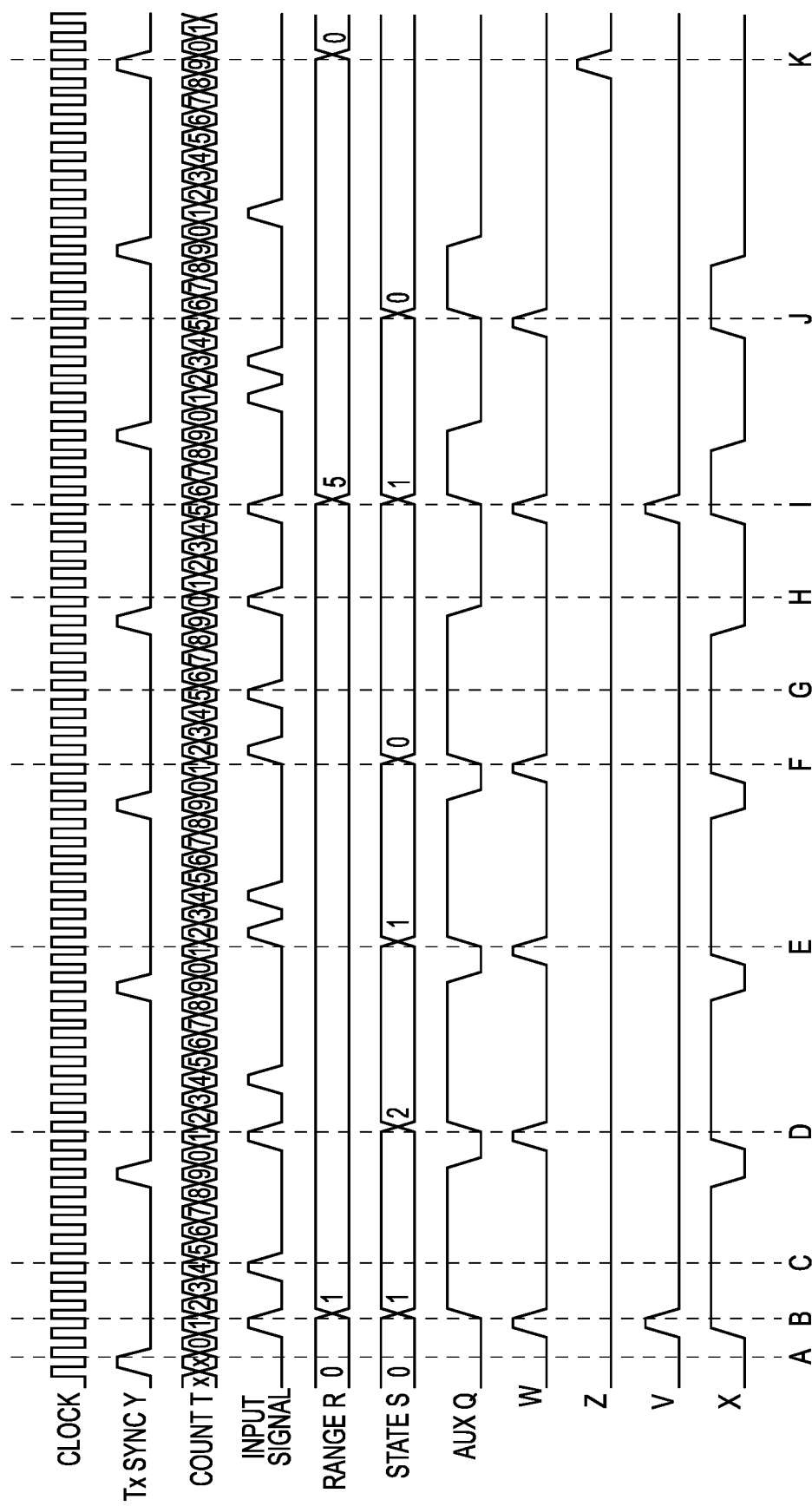
FIG. 6 is a timing diagram of the time-to-digital converter illustrated in FIG. 5 in accordance with an exemplary embodiment of the present technology.

In a second embodiment and operation, and referring to FIGS. 5 and 6, the TDC 120 may comprise the auxiliary register 505 having an output Q and the logic circuit 500. In the present embodiment, the logic circuit 500 may generate various outputs W, X. V, and Z given by the following equations:

$$W=(R==T)\cdot(S>0)+P\cdot(S==0)$$

$$Z=Y\cdot\overline{Q}$$

$$V=(S==0)\cdot P\cdot(T\geq R)\cdot\overline{Q}$$

$$X=(W+Q)\cdot\overline{Y}$$

The auxiliary register 505 and associated gates allow the state machine 200 to undergo only one state transition per RI (which may improve pipelining), and to reset the range register 210 when no state transition has occurred during a complete RI.

When the state machine 200 goes out of lock, entering state 0, the state machine 200 is unable to lock to a later SPAD pulse within the same RI. Instead, on the first RI after a loss of lock, the state machine 200 is only allowed to lock to range values greater than R. This ensures that all values of range are considered.

According to the present embodiment, the TDC 120 may undergo the following sequence of events:

At time A, the count value T is reset by the first sync Y.

At time B, in the $1^{st}$ RI, the state is 0 and the range is 0. The SPAD pulse with T=1 causes the range register 210 to be loaded with 1 and the state to increment to 1.

At time C, the $2^{nd}$ SPAD pulse in the $1^{st}$ RI is ignored. Two blocking conditions are true: 1) the state S is not 0; and 2) the auxiliary register 505 is set (=1), indicating that the state machine 200 has already undergone a state transition in this RI.

At time D, in the $2^{nd}$ RI the $1^{st}$ SPAD pulse occurs when the count value T is equal to the range value R, consequently the state S increases to 2. The next SPAD event is ignored as in time C.

At time E, in the $3^{rd}$ RI there is no SPAD pulse when the count value T matches the locked range value R, therefore the state decreases to 1.

At time F, in the $4^{th}$ RI there is no SPAD pulse when the count value T matches the locked range value R. Therefore the state decreases to 0.

At time G, still within the $4^{th}$ RI, the SPAD pulse occurs when the count value T is greater than the locked range and the state. However it is ignored because Q is set, the state machine 200 having already undergone a state transition.

At time H, at the start of the $5^{th}$ RI, a SPAD pulse occurs when the count value T is less than the range value R. Even though the state machine 200 is out of lock, this event is ignored by the state machine 200.

At time I, still within the $5^{th}$ RI, a SPAD pulse occurs when the count value T is greater than the range value R. This causes the range value R to be increased to the count value T, and the state of the state machine increase to 1.

At time J, in the $6^{th}$ RI no SPAD pulse occurs when expected and the state falls to 0.

At time K, at the end of the 7th RI there has not been a state transition. The state machine 200 has now had the opportunity to lock to all the later values than the previously locked range. The range value R is cleared to 0 and the system is in the same state as before the $1^{st}$ RI, ready to lock to any range.

Figure 7:
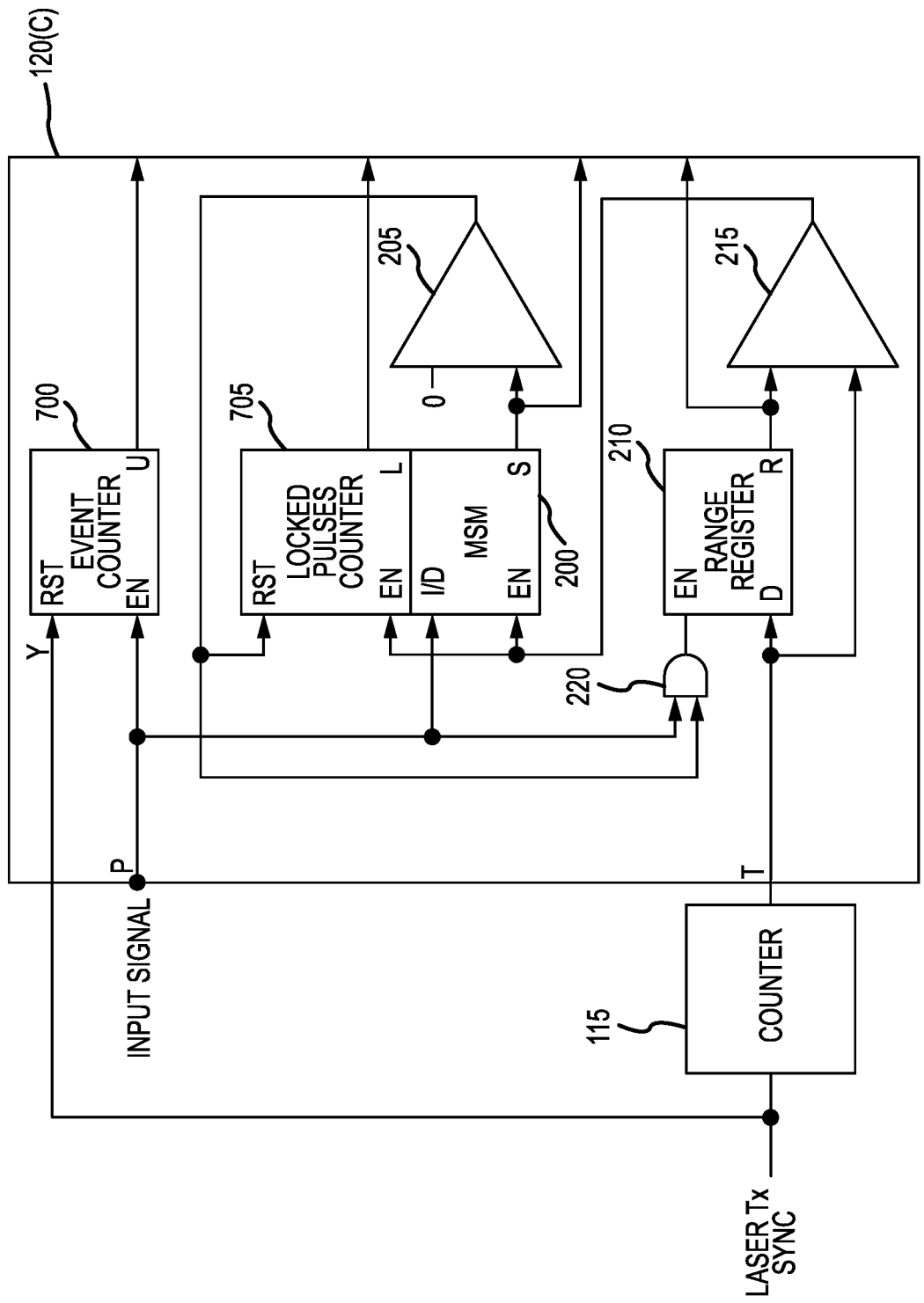
FIG. 7 is a block diagram of a time-to-digital converter in accordance with a third embodiment of the present technology.
Figure 8:
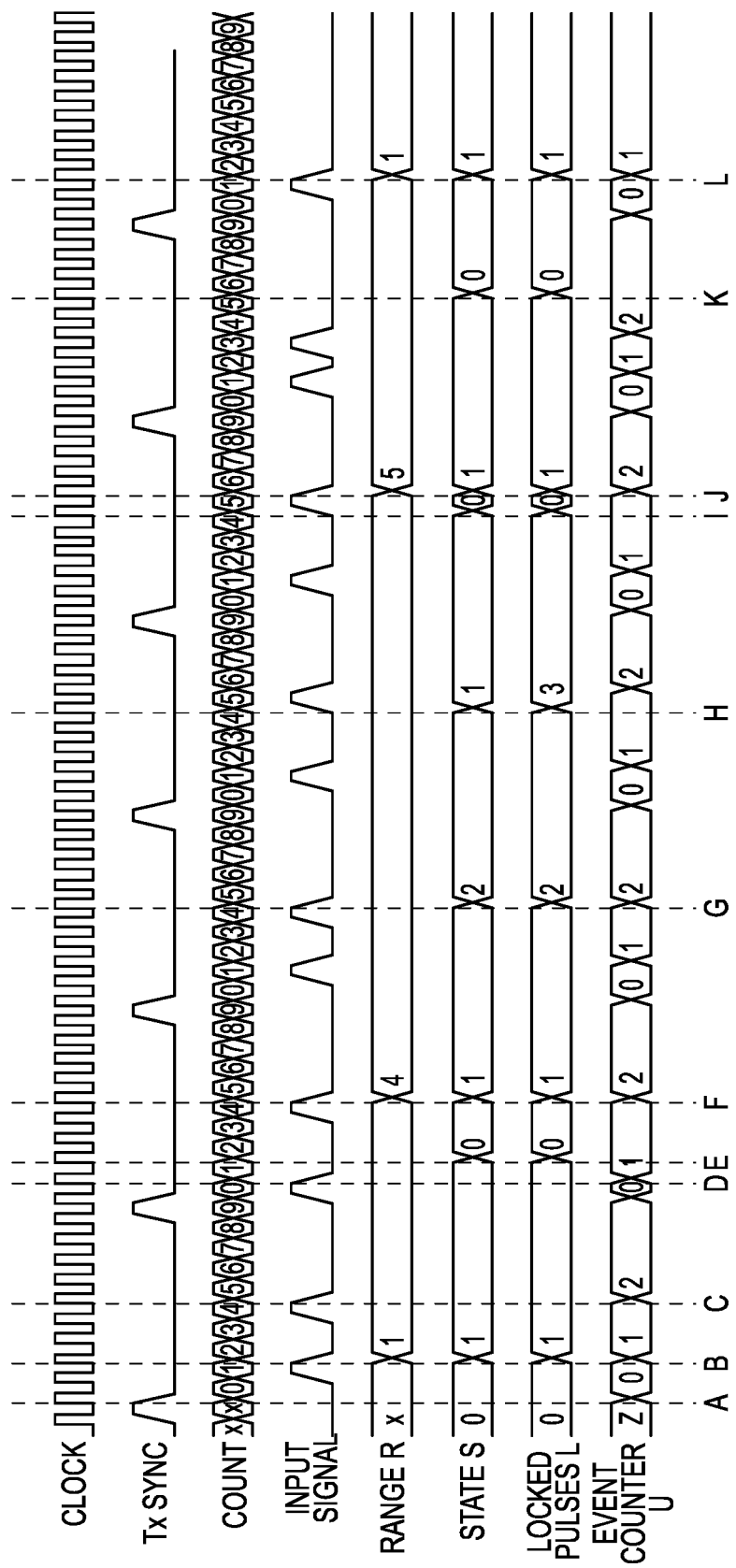
FIG. 8 is a timing diagram of the time-to-digital converter illustrated in FIG. 7 in accordance with an exemplary embodiment of the present technology.

In a third embodiment and operation, and referring to FIGS. 7, 8, and 16, the TDC 120 comprises the state machine 200, the range register 210, the locked pulses counter 705, and the event counter 700. In the present embodiment, the register 1600 of the state machine 200 and the register 1605 of the locked pulses counter 705 are truncated, such that before the locked pulses counter 705 reaches a maximum value or goes back to zero, a logic circuit 1610 of the state machine 200 divides the count value L and the state S by 2. This may keep the probability calculation (described below) approximately correct, with a slight reduction in the reported confidence of the lock.

The present embodiment, the logic 1610 may perform the following functions:

$$L' = \begin{Bmatrix} 2^{B-1} & | & L = 2^B - 1 \\ L+1 & | & L < 2^B - 1 \end{Bmatrix},$$

$$S' = \begin{Bmatrix} \dfrac{S-(-1)^F}{2} & | & L = 2^B - 1 \\ S-(-1)^F & | & L < 2^B - 1 \end{Bmatrix}$$

In the present embodiment, the locked pulses counter 705 is reset whenever the state machine 200 is in state 0 and advances whenever the range register 210 is equal to the input counter value T. At the end of the operation, if the state machine 200 is locked, the locked pulses counter 705 contains the number of cycles for which the state machine 200 has been locked in a state above 0. The event counter 700 counts all the SPAD events that have been seen during a frame of laser pulses.

Every cycle that the state machine 200 is locked to a particular range, it either moves up or down. We know that for S cycles it was moving up. But the remaining L–S cycles must be evenly split between up and down events, so the system 100 can add an additional (L–S)/2 pulses. Therefore, a total number H of positive hits over L pulses with a final state of S is:

$$H = S + \frac{L-S}{2} = \frac{L+S}{2}$$

According to the present embodiment, the TDC 120 may undergo the following sequence of events:

At time A, the event counter is reset by the Tx Sync, (which happens at the start of every RI).

At time B, a SPAD pulse causes the state machine 200 to go into lock (S>0). The locked pulses counter increases to 1 and the event counter counts the SPAD pulse.

At time C, the event counter 700 counts the second SPAD pulse in this RI.

At time D, the event counter 700 counts the $1^{st}$ SPAD pulse in the $2_{nd}$ RI.

At time E, the absence of a SPAD pulse at the expected time causes state machine 200 to go out of lock (S=0) and clears the locked pulses counter 705.

At time F, the $2_{nd}$ SPAD pulse in the $2_{nd}$ RI causes the state machine 200 to enter lock, the locked pulses counter 705 to increase and the event counter 700 to count the event. From here onwards the behavior of the event counter 700 is omitted.

At time G, the locked pulses counter 705 increases because the state machine 200 is still in lock.

At time H, the locked pulses counter 705 increases because the state machine 200 is still in lock even though the state is decreasing.

At time I, the locked pulses counter 705 is reset because the state machine 200 has gone out of lock.

According to the above embodiments and methods, the probability for determining if the final state of the state machine 200 is correct may be described according to Bayes' Theorem:

$$P(\text{range is correct} \mid H, L) = \frac{P(H, L \mid \text{range is correct}) \times P(\text{range is correct})}{P(H, L)}$$

Using the binomial theorem, the probability of getting exactly L hits in H samples with probability $p_r$ for the individual event probability given the correct match is:

$$P(H, L \mid \text{range is correct}) = \frac{L!}{H!(L-H)!}(p_r)^H (1-p_r)^{L-H}$$

where $p_r$ is the probability of a SPAD event per laser pulse during the time that the counter 115 equals the range value given that the TDC 120 is at the correct range. Likewise:

$$P(H, L \mid \text{range is incorrect}) = \frac{L!}{H!(L-H)!}(p_n)^H (1-p_n)^{L-H}$$

where $p_n$ is the (uniform) probability of a SPAD event per laser pulse during the time that the counter 115 equals the range value given that the TDC 120 is at an incorrect range.

The probability that a range chosen at random is correct is the reciprocal of the number of range gates:

$$P(\text{range is correct}) = 1/N$$

The probability for the occurrence of the data is the sum of 2 possibilities. The state machine 200 is either in the correct state or 1 of N−1 incorrect states.

$$P(H, L) = \begin{array}{l} P(\text{range is correct}) \times P(H, L \mid \text{range is correct}) + \\ P(\text{range is incorrect}) \times P(H, L \mid \text{range is in correct}) \end{array}$$

$$P(H, L) = \frac{1}{N} \times \frac{L!}{H!(L-H)!}(p_r)^H (1-p_r)^{L-H} + \frac{N-1}{N} \times \frac{L!}{H!(L-H)!}(p_n)^H (1-p_n)^{L-H}$$

Estimates of $p_r$ and $p_n$ in this pixel may be described as:

$$\hat{p}_r = \frac{H}{L}, \hat{p}_n = \frac{U}{P \times N}$$

The probability calculation may be done once per pixel per frame of pulses, and may be performed in the signal processing chain outside the pixel. The pixel itself may return digital values Q, S, U, and L.

Accordingly, all the terms in the expression for P(range is correct|H, L) have been calculated or estimated. If P(range is correct|H, L)>$p_t$, where $p_t$ is a threshold probability that is chosen, then it may be concluded that the range is correct. It is also observed that both P(H, L) and P(H, L|range is correct) contain the same binomial coefficient term $$\frac{L!}{H!(L-H)!}.$$

This term cancels in the expression for P(range is correct|H, L) which becomes:

$$P(\text{range is correct} \mid H, L) = $$

$$\frac{(p_r)^H(1-p_r)^{L-H}}{(p_r)^H(1-p_r)^{L-H} + (N-1) \times (p_n)^H(1-p_n)^{L-H}}$$

Given very small numbers and large values of H and L, the expression may be improved by dividing through by the numerator:

$$P(\text{range is correct} \mid H, L) = \frac{1}{1 + (N-1) \times \frac{(p_n)^H(1-p_n)^{L-H}}{(p_r)^H(1-p_r)^{L-H}}}$$

$$P(\text{range is correct} \mid H, L) = \frac{1}{1 + (N-1) \times \left(\frac{p_n}{p_r}\right)^H \left(\frac{1-p_n}{1-p_r}\right)^{L-H}}$$

Furthermore, a positive out of range number can be avoided by the expression:

$$P(\text{range is correct} \mid H, L) = \frac{1}{1 + (N-1) \times \left(\frac{p_n}{p_r}\right)^{2H-L} \left(\frac{p_n}{p_r} \times \frac{1-p_n}{1-p_r}\right)^{L-H}}$$

According to a fourth embodiment and operation, and referring to FIGS. 9, 10A-10B, and 16, the TDC 120 may comprise the gain calculator 1000, wherein the gain g is greater than 1. When the noise level is low, the state machine 200 may increment by more than one state when it receives a SPAD event, whilst still decreasing by only 1 state if it does not receive an expected SPAD event. This increases the likelihood of lock when a correct SPAD event is detected—the system stays in lock for more than one pulse, awaiting a further SPAD event. For example, when the gain g=2, the state machine 200 increments by 2 states (for example, as illustrated in FIG. 10A) and when the gain g=3, the state machine 200 increments by 3 states (for example, as illustrated in FIG. 10B).

In the present embodiment, the state machine 200 may have a maximum number of states equal to $P \times g_{max}$, where P is the number of pulses (e.g., P=16) and $g_{max}$ is a maximum gain.

In the present embodiment, the register 1600 of the state machine 200 and the register 1605 of the locked pulses counter 705 are truncated, such that before the locked pulses counter 705 reaches a maximum value or goes back to zero, the logic 1610 of the state machine 200 divides the count value L and the state S by 2. The following chart illustrates the number of bits in various registers as the number of divisions N varies and the maximum gain that can be applied for a specified N.

| N | $g_{max}$ | State machine register | Locked pulses counter register | Event counter register | Range register |
|---|---|---|---|---|---|
| 1024 | 204 | 1 2 | 10 | 8 | 10 |
| 512 | 102 | 11 | 10 | 13 | 9 |
| 256 | 51 | 10 | 10 | 6 | 8 |
| 128 | 26 | 9 | 10 | 5 | |

In the present embodiment, the state machine 200 dynamically adapts to the conditions that the corresponding pixel is undergoing, which may be measured in terms of the detection probability $p_r$ and the noise probability $p_n$. The expected mean inter-arrival time between detected SPAD events corresponding to reflections of the laser source may be 1/p laser pulses. To obtain a lock on the target with detection probability $p_r$, the state machine 200 should not fall out of lock before the next pulse is expected to arrive 1/$p_r$ laser pulses after the first. Conversely, to ensure the state machine 200 falls out of a false lock, the state machine 200 must not fall out of a false lock before the next noise SPAD event with probability $p_n$ arrives in the same bin. In the present embodiment, the state machine 200 drops 1 state every laser pulse for which no SPAD event occurs at the locked time, and increases g states when a SPAD event occurs. Therefore $1/p_n > g > 1/p_r$ where $$g = \text{round}\left(\frac{N}{5U}\right).$$

The state now increments with gain g on every hit (SPAD event at the locked time), and decreases by 1 on every miss. Accordingly:

$$S = gH - (L-H),$$

which may also be expressed as:

$$H = \frac{S+L}{g+1}$$

The probability may be calculated in the same way as described above, and may then be expressed as:

$$P(\text{range is correct} \mid H, L) = \begin{cases} 0 & \mid L = 0 \\ \frac{1}{1 + (N-1)\exp(k)} & \mid L > 0 \end{cases},$$

where $k = H\log\left(\frac{p_n}{p_r}\right) + (L-H)\log\left(\frac{1-p_n}{1-p_r}\right)$.

According to various embodiments, and referring to FIG. 12, the TDC 120 may be configured to defer incrementing the state machine 200 until after the end of the reception interval but before the end of the laser period. While the state machine 200 is incremented only once per reception interval, it may be decremented to fall out of lock and then incremented during the same reception interval (e.g., steps 1100, 1105, 1110, 1115, 1120, 1125, 1135, 1140, 1145, 1150). In the present case, the gain calculator 1000 calculates the gain g based on the count U of the all the SPAD events received during a reception interval (e.g., steps 1155, 1160, 1170), which is an estimate of $Np_n$. The gain calculator 1000 may compute the gain g by performing one division at the end of each laser period. For example, the gain calculator 1000 may be configured to perform long division iteratively on the same register over a number of cycles.

In the present case, and assuming that there is sufficient time after the end of the reception interval, if the TDC 120 detects a photon in either the expected position (when the state machine 200 is locked) or at any other position (when the state machine 200 is unlocked), the TDC 120 asserts the hit signal h. When the state machine 200 is at state 1, and the TDC 120 does not detect a SPAD event, the TDC 120 will clear the state machine 200 and the locked pulses counter 705, which causes them to fall out of lock and ready to lock onto the next detected SPAD event. At the end of the reception interval, if the state machine 200 is out of lock, then the TDC 120 may be waiting for the next photon detection (@ 1140). If the state machine 200 is in lock, then the TDC 120 passes through update stages (1155, 1170, 1160, 1165, 1175, and 1180) before returning to the start 1100 and waiting for the next laser pulse. During the update stages, a logic circuit (e.g., 500, 1610) of the state machine 200 may divide the count value L and the state S by 2 if the locked pulses counter 705 reaches a maximum value (Lmax).

In a fifth operation, and referring to FIGS. 11 and 13, the system 100 may be configured to defer operation of the state machine 200. In particular, the system 100 may defer (i.e., delay) update calculations, such as the gain calculation and/or incrementing of the state machine 200, to a time after the laser pulse returns to the TDC array 110. The facility to defer the update calculations to the end of the reception interval means that the calculations can be performed by smaller slower logic, and large functions such as division can be performed by a re-circulating division circuit, which is smaller than a pipelined division circuit.

In the present embodiment, the first sub-circuit 1200 may transmit a signal indicating the count of SPAD pulses in this reception interval U, a locked range R, and five 1-bit signals to the second sub-circuit 1205. Signal V is asserted when the event counter 600 has exceeded some maximum value and indicates that the state machine 200 update should commence. Signal V' is asserted at some time later after the gain calculator 1000 has performed a gain calculation, and causes the update of the state machine 200 itself. The signal $s_0$ is used to indicate that the state machine 200 is in the unlocked state (0) and the just locked state (1). Signal $s_1$ used to indicate the state machine 200 will fall out of lock if the next expected SPAD event is missed. The hit signal h indicates that an expected SPAD event has occurred if the state machine 200 is in lock, or that a new lock has been established if the state machine 200 was out of lock. The lock lost signal r is used to replicate the behavior of the state machine 200 when it falls out of lock and allows the state machine 200 to relock later in the same reception interval. The logic equations for the above-referenced signals may be described as follows:

$$W' = (s_0 + (T == R) + r).P;$$

$$Z' = \begin{cases} 0 & | & Y = 1 \\ 1 & | & s_1.(T == R).\overline{P} \\ r & | & \text{otherwise} \end{cases};$$

$$E = (r + s_0).P;$$

$$R0 = (r == 1).(h == 0); \text{ and}$$

$$R1 = (r == 1).(h == 1).$$

According to the present embodiment, the TDC 120 may undergo the following sequence of events:

At time A, on the first Tx Sync the state machine 200 is in state 0, h=0 and r=0.

At time B, the first received SPAD pulse increments U, locks the range value R and sends h high.

At time C, a second SPAD pulse increments U.

At time D, pulse over (V) starts the gain computation. With U=2 we obtain g=1 and V' is set.

At time E, V' causes the state S to be increased by g to S=1, and L is incremented to 1. Meanwhile, the new laser sync clears U and h.

At time F, a $1^{st}$ SPAD pulse in the $2^{nd}$ RI increments U.

At time G, the absence of an expected SPAD pulse when T==R and S==1 sends the lock lost signal r high and the system behaves as though the state machine 200 had changed to state 0.

At time H, with r==1, the system locks the range at the next SPAD pulse within the $2^{nd}$ RI, and h is set, indicating a SPAD pulse and positive lock.

At time I, with r==1 and h==1 the system has lost lock and regained it. The gain g is set to one less than the normal increment value. In this instance, g=1−1=0. R1 is asserted so the locked counter stays at L=1.

At time J, the state is incremented by g=1 because h=1, S=1 and r=0. L is also incremented.

At time K, the state is decremented by g=−1 when h=0, S>1 and r=0. L is incremented.

At time L, the system loses and regains lock in the same cycle. R1 is asserted so the locked counter synchronously resets to L=1.

At time M, the system loses lock and the state is decremented g=−1 when h=0, S=1 and r=0. R0 is asserted so the locked pulse counter clears to L=0.

At time N, the system regains lock like at time E.

According to various embodiments, the TDC 120 may be configured to perform range following. A change in range means that the time of arrival of the reflected photons will increase or decrease. If it is the same object, the range will change slowly with respect to a laser pulse repetition time of only a few μs. To accommodate this, the state machine 200 may increment the state on a SPAD event occurring within a few cycles (typically ±1) of the locked range, and the locked range can be moved towards the new time of arrival by a fraction of a clock cycle. The locked range may therefore have a few fractional bits.

Referring to FIGS. 14A-14B, the window of acceptance is represented by the width of the box and the state of the state machine 200 is represented by the height of the box. The fact that this is non-zero means that the state machine 200 is in lock.

The top diagram shows the initial state. Without range following, the width of the acceptance window is $$\pm \frac{1}{2}.$$

With range tracking it is $$\pm 1\frac{1}{2}.$$

When a SPAD event arrives at the expected time, both the standard state machine (SSM) (as illustrated in FIG. 14A) and embodiments of the state machine 200 of the present technology (as illustrated in FIG. 14B) increment their state by g. When a pulse arrives a long way from the locked time (bottom), it is rejected by both the SSM and the state machine 200, and the state is decremented. When a SPAD event arrives at a time close to the expected time, the SSM rejects it, decrementing the state. The state machine 200 accepts it, and the state is incremented by g. The window of acceptance is moved towards the time of arrival (in this case by ¼ of a time tick). In addition, the amount of movement and the gain g may be weighted according to the amount by which the arrival time is different from the expected time.

If we consider an object (generally larger than one pixel) moving across the pixel array, at some point it will begin to impinge upon a new pixel. The state machine 200 for that pixel will lose lock on the old range and begin to search for a new range. Several approaches are possible to assist the out-of-lock state machine 200 to quickly acquire a lock. One possibility is to simply increment the state machine 200 by more than g when the new locked range matches (approximately or exactly) the locked range of an adjoining pixel.

According to various embodiments, the TDC 120 may be configured to perform azimuth/elevation following. In some instances, an object (generally larger than one pixel) moving across the pixel array will, at some point, begin to impinge upon a new pixel. The state machine 200 for that pixel will lose lock on the old range and begin to search for a new range. In various embodiments of the present technology, the state machine 200 may quickly acquire a lock by incrementing the state by more than g when the new locked range matches (approximately or exactly) the locked range of an adjacent TDC 120.

Referring to FIGS. 15A-15B, the top line illustrates the state with the SSM out of lock (FIG. 15A) and the locked range from an adjacent state machine 200 in accordance with embodiments of the present technology (FIG. 15B). The SSM is sensitive to the next SPAD event it receives. On the middle line, both the SSM and the state machine 200 are sensitive to the next detected SPAD event at any time. At the bottom line, the SSM and state machine 200 enter lock at the time the SPAD event is received, but the state of the state machine 200 is increased more because of the match with a neighboring state machine 200.

Alternatively, (not illustrated), an out-of-lock state machine 200 may be able to lock only to the range of locked adjacent pixels for a few pulses (if it receives a SPAD event at the correct time), otherwise it may begin reacquiring at any range.

In various embodiments, the TDC 120 may employ the tracking methods described with respect to FIGS. 14-15 as well as the truncated registers of the state machine 200 and the locked pulses counter 705. In such cases, the TDC 120 does not need to be reset at the start of each frame of laser pulses as the registers can run forever without overflowing. Accordingly, the output rate of information can be at any arbitrary rate, instead of once per frame, which increases the performance of the TDC 120 because it can adapt more quickly to changes in the scene.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A system comprising:
   a pixel that comprises a single-photon avalanche diode, wherein the pixel is configured to output an event signal that has a first value when a photon is detected by the single-photon avalanche diode and a second value when no photons are detected by the single-photon avalanche diode; and
   a time-to-digital converter comprising a state machine, wherein the state machine is configured to receive the event signal from the pixel and change to a new state based at least on a current state and the event signal.

2. The system defined in claim 1, wherein the state machine is a Markov state machine.

3. The system defined in claim 1, wherein the state machine is configured to initialize to a state, increment the state when the event signal has the first value, and decrement the state when the event signal has the second value.

4. The system defined in claim 3, wherein the first value is 1 and wherein the second value is 0.

5. The system defined in claim 4, wherein initializing to a state comprises initializing to 0.

6. The system defined in claim 1, wherein the time-to-digital converter comprises:
 a range register that is configured to receive a count value from a counter.

7. The system defined in claim 1, wherein the time-to-digital converter comprises:
 a comparator connected to an output terminal of the state machine and configured to compare a current state of the state machine to a starting state.

* * * * *